United States Patent
Kato (10) Patent No.: US 10,815,944 B2
(45) Date of Patent: *Oct. 27, 2020

(54) PARTITION PLATE

(71) Applicant: SUBARU CORPORATION, Tokyo (JP)

(72) Inventor: Masaaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/371,581

(22) Filed: Apr. 1, 2019

(65) Prior Publication Data

US 2019/0226433 A1  Jul. 25, 2019

Related U.S. Application Data (63) Continuation of application No. 15/885,488, filed on Jan. 31, 2018, now Pat. No. 10,393,075.

(30) Foreign Application Priority Data

Mar. 28, 2017 (JP) ................................. 2017-063933

(51) Int. Cl.
*F02M 35/10* (2006.01)
*F02M 35/12* (2006.01)

(52) U.S. Cl.
CPC ........................... *F02M 35/10262* (2013.01); *F02M 35/10118* (2013.01); *F02M 35/10124* (2013.01); *F02M 35/10255* (2013.01); *F02M 35/1211* (2013.01); *Y02T 10/146* (2013.01)

(58) Field of Classification Search
CPC ....... F02M 35/10262; F02M 35/10255; F02M 35/1211; F02M 35/10118; F02M 35/10124

See application file for complete search history.

(56) References Cited

U.S. PATENT DOCUMENTS

| | | | | |
|---|---|---|---|---|
| 3,173,241 | A | * | 3/1965 | Birmann ................... F02C 3/05 60/605.1 |
| 5,758,614 | A | | 6/1998 | Choi |
| 5,924,398 | A | * | 7/1999 | Choi ....................... F02D 9/104 123/184.21 |

(Continued)

FOREIGN PATENT DOCUMENTS

| JP | H06-159079 A | 6/1994 |
|---|---|---|
| JP | H09-256858 A | 9/1997 |

(Continued)

OTHER PUBLICATIONS

Reasons for Rejection dated Oct. 2, 2018 during the prosecution of Japanese Patent Application No. 2017-063933.

*Primary Examiner* — Syed O Hasan
(74) *Attorney, Agent, or Firm* — Troutman Pepper Hamilton Sanders LLP (57) ABSTRACT

A partition plate is configured to separate an intake passage formed by an intake pipe to be coupled to a combustion chamber into a first intake passage and a second intake passage. The first intake passage is openable and closable by a valve. A shape of a first cross section orthogonal to an extending direction of the intake pipe is set on the basis of a shape of a surface of the intake pipe that faces the partition plate with the second intake passage interposed therebetween.

5 Claims, 4 Drawing Sheets (56) References Cited

U.S. PATENT DOCUMENTS

| | | | |
|---|---|---|---|
| 5,937,815 A | 8/1999 | Hidaka | |
| 7,198,026 B2* | 4/2007 | Masuta | B22C 9/10 |
| | | | 123/302 |
| 9,488,111 B2* | 11/2016 | Gibson, II | F02D 9/1095 |
| 2004/0211390 A1* | 10/2004 | Kim | F02D 9/10 |
| | | | 123/308 |
| 2005/0051375 A1* | 3/2005 | Momosaki | F02M 35/10013 |
| | | | 180/219 |

FOREIGN PATENT DOCUMENTS

| | | |
|---|---|---|
| JP | H10-274045 A | 10/1998 |
| JP | H11-166420 A | 6/1999 |
| JP | 2006-257976 A | 9/2006 |
| JP | 2009-293381 A | 12/2009 |
| JP | 2010-090849 A | 4/2010 |

\* cited by examiner

PARTITION PLATE

CROSS-REFERENCE TO RELATED APPLICATIONS

The present application is a continuation application of U.S. patent application Ser. No. 15/885,488 filed on Jan. 31, 2018, which claims priority from Japanese Patent Application No. 2017-063933 filed on Mar. 28, 2017, the entire contents of which are hereby incorporated by reference.

BACKGROUND

1. Technical Field

The present invention relates to partition plates disposed inside intake pipes.

2. Related Art

In the related art, an engine is provided with a partition plate that partitions an intake passage within an intake pipe into two intake passages (a first intake passage and a second intake passage) so as to generate a tumble flow (vertical vortex) within a combustion chamber. When the load is small and the intake flow rate is low, for instance, the opening of the first intake passage partitioned by the partition plate is reduced by a tumble generation valve (TGV) so as to increase the flow speed of intake air flowing into the combustion chamber from the second intake passage, whereby a strong tumble flow can be generated within the combustion chamber.

In the disclosure of Japanese Unexamined Patent Application Publication (JP-A) No. 2010-090849, two intake ports branching off from an intake manifold substantially have an isosceles triangle shape in which the surface where the two intake ports face each other serves as the base, so that a stronger tumble flow can be effectively generated.

However, in the related-art technology described in JP-A No. 2010-090849, the direction of the circulation axis of the generated tumble flow is inconsistent at a plurality of positions in the direction orthogonal to the direction extending from the intake side toward the exhaust side within the combustion chamber. This causes, for instance, a secondary flow (horizontal vortex) to occur in the swirling direction during the compression stroke of the engine, which is problematic in that the air-fuel mixture cannot be stably combusted during the combustion stroke of the engine.

SUMMARY OF THE INVENTION

It is desirable to provide a partition plate that can effectively generate a tumble flow and that can improve the combustion stability of an engine.

An aspect of the present invention provides a partition plate configured to separate an intake passage formed by an intake pipe to be coupled to a combustion chamber into a first intake passage and a second intake passage. The first intake passage is openable and closable by a valve. A shape of a first cross section orthogonal to an extending direction of the intake pipe is set on the basis of a shape of a surface of the intake pipe that faces the partition plate with the second intake passage interposed therebetween.

DETAILED DESCRIPTION

A preferred example of the present invention will be described in detail below with reference to the appended drawings. For instance, the dimensions, materials, and other specific numerical values indicated in this example are merely examples for providing an easier understanding of the example of the invention and are not intended to limit the example of the present invention, unless otherwise specified. In this description and the drawings, components having substantially identical functions and configurations are given the same reference signs, and redundant descriptions thereof are omitted. Furthermore, components that are not directly related to the example of the present invention are not illustrated in the drawings.

Figure 1:
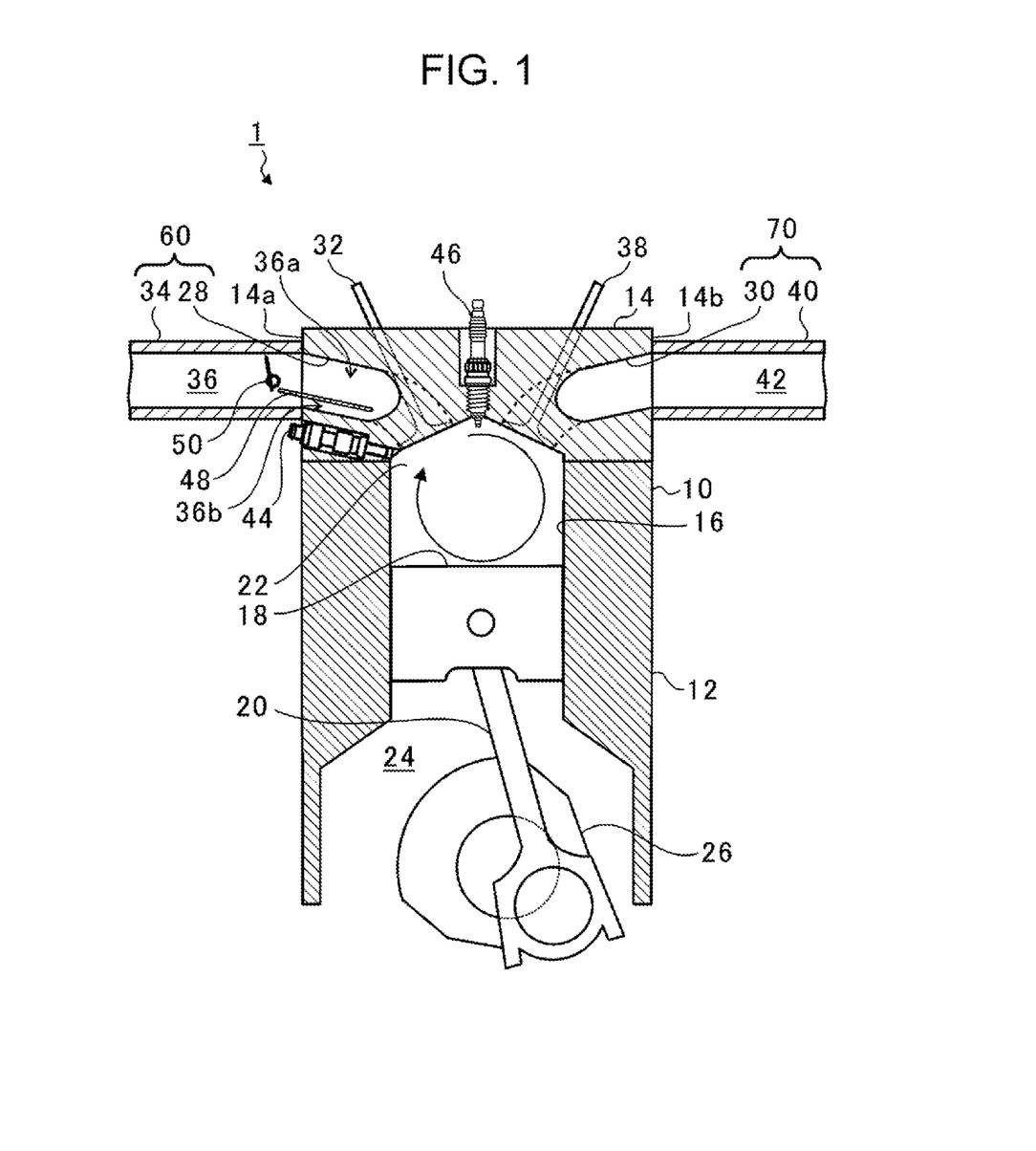
FIG. 1 schematically illustrates the configuration of an engine.

FIG. 1 schematically illustrates the configuration of an engine 1. As illustrated in FIG. 1, the engine 1 is provided with a cylinder block 10, a crankcase 12 integrated with the cylinder block 10, and a cylinder head 14 coupled to the cylinder block 10.

The cylinder block 10 has a plurality of cylinder bores 16. In each cylinder bore 16, a piston 18 is slidably supported by a connecting rod 20. A space surrounded by the inner wall surface of the cylinder head 14, the inner wall surface of the cylinder bore 16, and the crown of the piston 18 serves as a combustion chamber 22.

A crankshaft 26 is rotatably supported within a crank chamber 24 formed by the crankcase 12. The crankshaft 26 is coupled to the piston 18 by the connecting rod 20. Thus, the piston 18 is coupled to the crankshaft 26 by the connecting rod 20.

The cylinder head 14 has an intake port 28 and an exhaust port 30 that spatially communicate with the combustion chamber 22. The intake port 28 has one opening at the intake upstream side and two openings at the intake downstream side facing the combustion chamber 22, and branches off into two passages in midstream from the upstream side toward the downstream side. The head of an intake valve 32 is located between the intake port 28 and the combustion chamber 22. The intake valve 32 opens and closes the intake port 28 relative to the combustion chamber 22 in accordance with rotation of a camshaft (not illustrated).

An upstream end 14a where the intake port 28 is provided in the outer wall surface of the cylinder head 14 is coupled to an intake manifold 34. An intake passage 36 to which intake air is introduced is provided inside the intake manifold 34 and the intake port 28. The intake manifold 34 and the intake port 28 that constitute the intake passage 36 will collectively be referred to as "intake pipe 60" hereinafter.

The exhaust port 30 has two openings at the exhaust upstream side facing the combustion chamber 22 and one opening at the exhaust downstream side, and merges into one passage in midstream from the upstream side toward the downstream side. The head of an exhaust valve 38 is located between the exhaust port 30 and the combustion chamber 22. The exhaust valve 38 opens and closes the exhaust port 30 relative to the combustion chamber 22 in accordance with rotation of a camshaft (not illustrated).

A downstream end 14b where the exhaust port 30 is provided in the outer wall surface of the cylinder head 14 is coupled to an exhaust manifold 40. An exhaust passage 42 to which exhaust air is introduced is provided inside the exhaust port 30 and the exhaust manifold 40. The exhaust manifold 40 and the exhaust port 30 that constitute the exhaust passage 42 will collectively be referred to as "exhaust pipe 70" hereinafter.

The cylinder head 14 is provided with an injector 44 and an ignition plug 46, the tips of which are located within the combustion chamber 22. Fuel is sprayed from the injector 44 toward intake air flowing into the combustion chamber 22 via the intake port 28. By discharging electricity from the ignition plug 46 at a predetermined timing, a mixture of the intake air and the fuel is ignited and combusted. The combustion causes the piston 18 to reciprocate within the cylinder bore 16, and the reciprocation is converted into rotation of the crankshaft 26 via the connecting rod 20.

The intake passage 36 is provided with a partition plate 48 and a tumble generation valve (TGV) 50. The partition plate 48 and the TGV 50 are provided between a throttle valve (not illustrated) and the combustion chamber 22. In this example, the partition plate 48 is disposed such that one end is provided at a predetermined position inside the intake manifold 34 and the other end is provided at a position in front of (i.e., upstream of) where the passage inside the intake port 28 branches off into two passages. Alternatively, this example is not limited to this configuration, such that the other end may extend to a position behind (i.e., downstream of) where the passage inside the intake port 28 branches off into two passages. The partition plate 48 extends in the intake-air flowing direction within the intake passage 36 (i.e., the extending direction of the intake pipe 60) and partitions (separates) the intake passage 36 into a first intake passage 36a and a second intake passage 36b. The TGV 50 is disposed at a position facing the first intake passage 36a at the upstream side of the partition plate 48 and adjusts the opening of the first intake passage 36a.

As illustrated in FIG. 1, when the opening of the TGV 50 is at a minimum and one of the passages partitioned by the partition plate 48 (i.e., the first intake passage 36a in this case) is closed by the TGV 50, the air introduced to the intake passage 36 travels through the other passage partitioned by the partition plate 48 (i.e., the second intake passage 36b in this case) so as to be introduced to the combustion chamber 22.

In a case where the load is small and the intake flow rate is low in the engine 1, the opening of the TGV 50 is reduced so as to cause most of the intake air to travel through the second intake passage 36b partitioned by the partition plate 48. Accordingly, in the engine 1, the air with the increased flow speed is made to flow into the combustion chamber 22, so that a strong tumble flow indicated by an arrow is generated within the combustion chamber 22. Consequently, the engine 1 achieves improved fuel consumption owing to improved fuel dilution and higher lean-burn limit, as well as improved combustion stability owing to fast combustion.

Alternatively, this example is not limited to this configuration, such that the second intake passage 36b may be closed by the TGV 50 and the intake air may be introduced into the combustion chamber 22 via the first intake passage 36a.

Figure 2A:
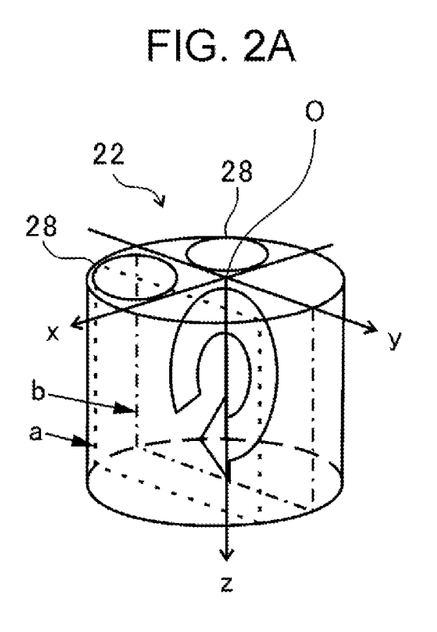
FIGS. 2A to 2C schematically illustrate the shape of a combustion chamber of the engine.
Figure 2B:
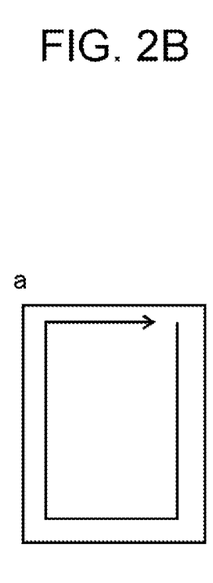
Figure 2C:
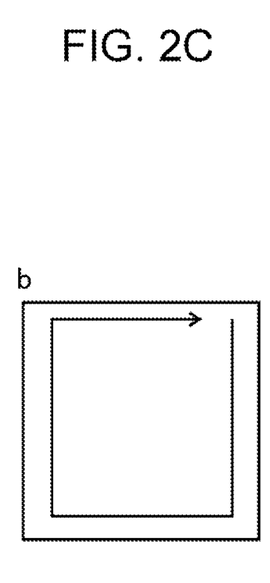

FIGS. 2A to 2C schematically illustrate the shape of the combustion chamber 22. Specifically, FIG. 2A schematically illustrates the shape of the combustion chamber 22. In FIG. 2A, the combustion chamber 22 is given a cylindrical shape for simplifying the description of the shape of the combustion chamber 22. Directions extending through a center O of the upper surface of the combustion chamber 22 and orthogonal to one another are expressed as "x direction", "y direction", and "z direction". The direction extending from the intake side toward the exhaust side in the cylinder head 14 (i.e., the combustion chamber 22) will be defined as "y direction" (second direction), the axial direction of the cylinder bore 16 will be defined as "z direction" (first direction), and the direction orthogonal to the y direction and the z direction will be defined as "x direction".

A tumble flow indicated by an empty arrow in FIG. 2A and circulating within a y-z cross section is generated such that a tumble flow with the same circulation time and the same circulation axis (sometimes referred to as "good tumble flow" hereinafter) is generated at any of a plurality of different positions on the x axis, thereby suppressing rotation of the tumble flow in the direction of the x-y plane (i.e., a direction orthogonal to the axial direction of the cylinder bore 16) during the compression stroke of the engine 1. By suppressing rotation of the tumble flow in the direction of the x-y plane during the compression stroke of the engine 1, improved combustion stability can be achieved in the combustion stroke after the compression stroke. In other words, a stable high-dilution high-lean-burn operation of the engine 1 can be realized.

In order to achieve such a good tumble flow in this example, the shape of the partition plate 48 is set based on the shape of the combustion chamber 22 and the shape of the intake pipe 60.

The method for setting the shape of the partition plate 48 will be described in detail below.

FIG. 2B illustrates a cross-sectional shape a of the combustion chamber 22, indicated by a dash line in FIG. 2A, taken through a position shifted from the center O in the x direction. FIG. 2C illustrates a cross-sectional shape b of the combustion chamber 22, indicated by a single-dot chain line in FIG. 2A, taken through a y-z cross section extending through the center O.

In this example, the cross-sectional shape a and the cross-sectional shape b are both rectangular. A length (perimeter) La (x, θ) of each of the cross-sectional shape a and the cross-sectional shape b in the circumferential direction indicated by arrows in FIGS. 2B and 2C is calculated by using expressions (1) to (3) indicated below, where B denotes a cylinder bore diameter (cylinder inner diameter) of the engine 1 and H(θ) denotes a stroke that changes in accordance with a crank angle θ of the engine 1. The crank angle θ is set to 0° in a case where the piston 18 is located at the top dead center in the intake stroke.

$$x^2 + y(x)^2 = (B/2)^2 \quad (1)$$

$$2y(x) = 2\sqrt{((B/2)^2 - x^2)} \quad (2)$$

$$La(x,\theta) = 2 \times 2y(x) + 2 \times H(\theta) \quad (3)$$

Figure 3:
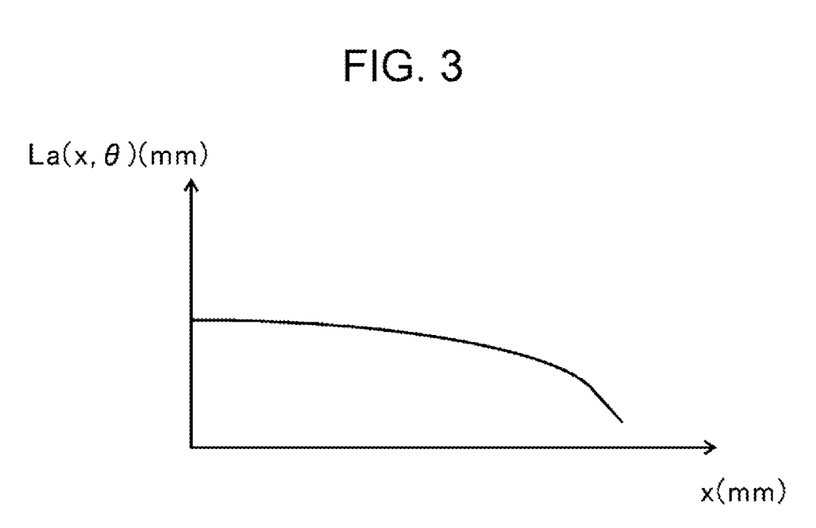
FIG. 3 is a diagram for explaining the length in the circumferential direction relative to the position in the x direction of the combustion chamber.

FIG. 3 is a diagram for explaining the length La(x, θ) in the circumferential direction relative to the position in the x direction. In FIG. 3, the perimeter La(x, θ) illustrated is calculated by using expression (3) in a case where, for instance, the crank angle θ is 300°. Alternatively, the crank angle θ used when calculating the stroke H(θ) in expression (3) is not limited to this value and may be set to any value. When evaluating the perimeter La(x, θ), it is desirable that the evaluation be performed before the tumble flow becomes compressed and collapsed after the intake valve 32 is closed. Therefore, it is desirable to set the crank angle θ between 180° and 340°.

As it is apparent from expression (3) and FIG. 3, the perimeter La(x, θ) in the y-z cross section (second cross section) of the combustion chamber 22 changes in accordance with the position in the x direction, assuming that the crank angle θ (stroke) is fixed. For instance, when the cross-sectional shape a and the cross-sectional shape b that have the same crank angle θ (stroke) in FIGS. 2B and 2C are compared, the perimeter La (x=0, θ) of the cross-sectional shape b is larger than the perimeter La (x>0, θ) of the cross-sectional shape a. As illustrated in FIG. 3, the perimeter La (x, θ) is at a maximum when x=0.

Therefore, in order to generate a good tumble flow within such a combustion chamber 22, it is necessary to consider the perimeter La(x, θ) of the y-z cross section of the combustion chamber 22. Specifically, if a tumble flow having a speed (flow speed) according to the perimeter La(x, θ) is generated, the tumble flow would have the same circulation time and the same circulation axis in each y-z cross section within the combustion chamber 22.

For instance, the speed (first flow speed) of the tumble flow generated in the cross-sectional shape b is set to be higher than the speed (second flow speed) of the tumble flow generated in the cross-sectional shape a, and the time it takes for the tumble flow to make one full circuit in the cross-sectional shape b is set equal to the time it takes for the tumble flow to make one full circuit in the cross-sectional shape a. As a result, the circulation time and the circulation axis of the tumble flow are made identical between the cross-sectional shape a and the cross-sectional shape b. By generating a tumble flow having the speed (flow speed) according to the perimeter La(x, θ) in this manner, a tumble flow having a uniform circulation time and a uniform circulation axis, that is, a good tumble flow, can be generated.

Figure 4:
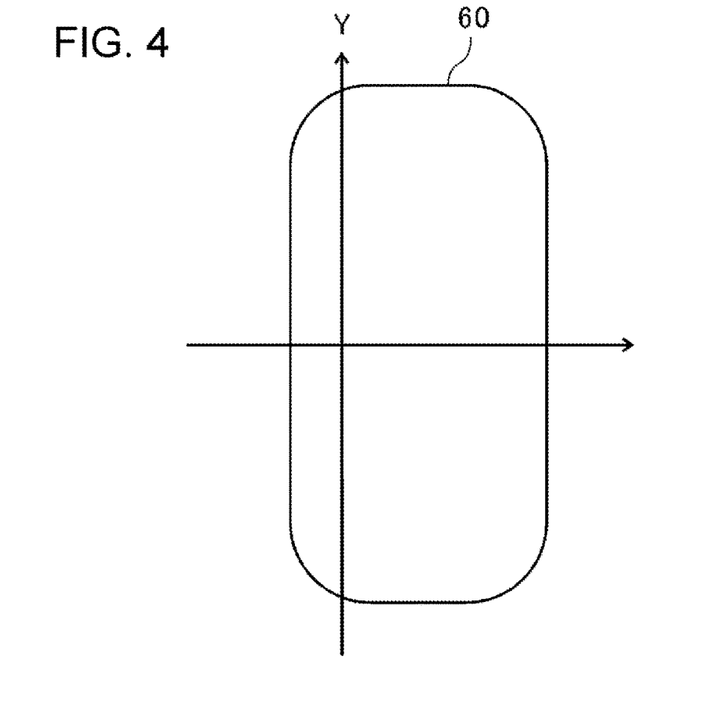
FIG. 4 is a schematic cross-sectional view of an intake pipe.

FIG. 4 is a schematic cross-sectional view of the intake pipe 60. Specifically, FIG. 4 illustrates the cross-sectional shape of the intake pipe 60 taken in a cross section (first cross section) orthogonal to the direction in which the intake passage 36 of the intake pipe 60 extends. In FIG. 4, the intake pipe 60 has a rounded-corner rectangular cross-sectional shape for simplifying the description of the shape of the intake pipe 60. In this example, the cross-sectional shape of the intake pipe 60 varies in the direction in which the intake passage 36 of the intake pipe 60 extends. In FIG. 4, the longitudinal direction of the intake pipe 60 having the rounded-corner rectangular shape is defined as "Y direction".

Since the intake air flows along the intake pipe 60 before entering the combustion chamber 22, the shape of the intake pipe 60 also has an effect on the generation of a good tumble flow. For instance, in a case where the first intake passage 36a is closed by the TGV 50, as described above, intake-air flow-speed distribution according to the cross-sectional shape of the second intake passage 36b, that is, the shape of the surface where the intake pipe 60 and the partition plate 48 face each other, is formed within the second intake passage 36b. The intake-air flow-speed distribution according to the shape of the surface where the intake pipe 60 and the partition plate 48 face each other is reflected on a tumble flow to be generated within the combustion chamber 22. Therefore, in order to generate a good tumble flow, it is also necessary to consider the shape of the surface of the intake pipe 60 that faces the partition plate 48.

Accordingly, in order to realize a good tumble flow, it is necessary to set the shape of the partition plate 48 based on the shape of the combustion chamber 22 (i.e., the aforementioned perimeter La(x, θ) of the combustion chamber 22) and the shape of the intake pipe 60 (i.e., the aforementioned shape of the surface of the intake pipe 60 that faces the partition plate 48).

In detail, the shape of an opposing surface of the partition plate 48 facing the intake pipe 60 with the second intake passage 36b interposed therebetween in a cross section orthogonal to the extending direction of the intake pipe 60, that is, a shape Lb(Yp, l) of the partition plate 48, is calculated (set) in accordance with expression (4) indicated below. In expression (4) indicated below, the shape Lb(Yp, l) expresses the distance from an opposing surface (i.e., the inner bottom surface) of the intake pipe 60 facing the partition plate 48 with the second intake passage 36b interposed therebetween to the opposing surface of the partition plate 48 facing the intake pipe 60 with the second intake passage 36b interposed therebetween.

$$Lb(Yp,l)=Ip(Yp,l)+a\cdot La(x,\theta)+b \qquad (4)$$

In this case, Ip(Yp, l) denotes a shape 60b of the opposing surface (i.e., the inner bottom surface) of the intake pipe 60 facing the partition plate 48 with the second intake passage 36b interposed therebetween, a denotes a coefficient set based on, for instance, a tumble ratio and the shape of the intake valve 32, b denotes a coefficient for setting the opening area of the second intake passage 36b, Yp denotes any position in the longitudinal direction of the partition plate 48 (or the intake pipe 60) in the cross section orthogonal to the extending direction of the intake pipe 60 (simply referred to as "extending direction" hereinafter), l denotes any position in the extending direction, and θ denotes a crank angle of the engine 1. The coefficients a and b are values (coefficients) determined from an empirical formula.

Figure 5:
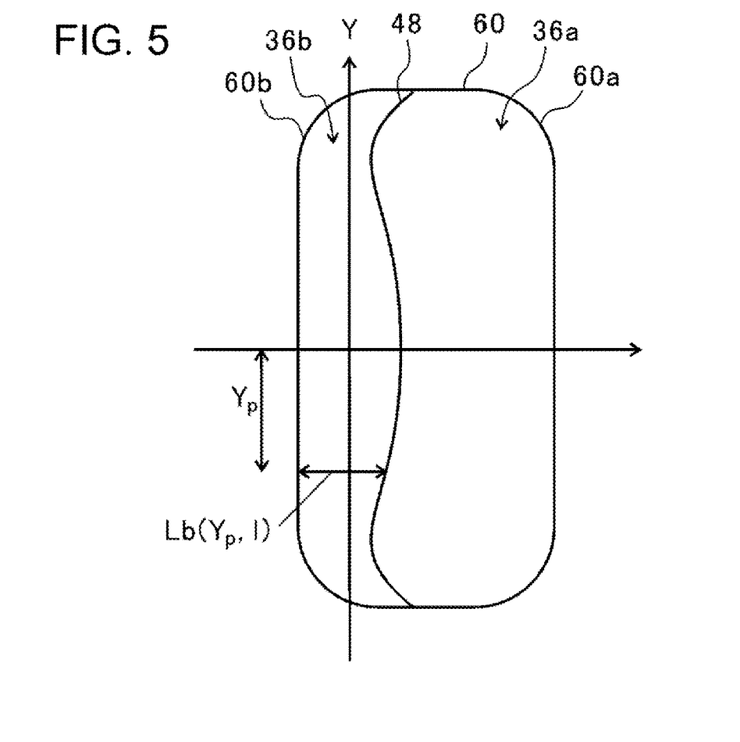
FIG. 5 is a schematic cross-sectional view of the intake pipe and a partition plate according to an example.

FIG. 5 is a schematic cross-sectional view of the intake pipe 60 and the partition plate 48. In FIG. 5, the shape Lb(Yp, l) of the partition plate 48 calculated from expression (4) is illustrated. As illustrated in FIG. 5, the partition plate 48 has a curved shape in the cross section orthogonal to the extending direction.

It is apparent from expression (4) that the shape Lb(Yp, l) of the partition plate 48 is set based on the perimeter La(x, θ) of the combustion chamber 22 and the shape 60b (Ip(Yp, l)) of the intake pipe 60.

By setting the shape Lb(Yp, l) of the partition plate 48 based on the shape 60b (Ip(Yp, l)) of the intake pipe 60, the distance between the intake pipe 60 (i.e., the shape 60b) and the partition plate 48 can be fixed, so that the flow-speed distribution of intake air flowing within the second intake passage 36b can be made uniform in the Y direction.

Furthermore, by setting the shape Lb(Yp, l) of the partition plate 48 based on the perimeter La(x, θ) of the combustion chamber 22, a tumble flow having a speed (flow speed) according to each perimeter La(x, θ) in the x direction of the combustion chamber 22 can be generated, whereby a good tumble flow having a uniform circulation time and a uniform circulation axis can be generated within the combustion chamber 22.

Therefore, according to this example, the shape Lb(Yp, l) of the partition plate 48 that satisfies expression (4) is set, so that a partition plate 48 that can effectively generate a tumble flow and that can improve the combustion stability of the engine 1 can be provided.

Modification

In the above description, the shape Lb(Yp, l) of the partition plate 48 is calculated assuming that the intake air flows (i.e., a tumble flow is generated) along the wall surface of the combustion chamber 22. However, in actuality, the intake air does not always flow along the wall surface of the combustion chamber 22, such that a tumble flow may sometimes be generated away from the wall surface of the combustion chamber 22.

In this modification, the shape Lb(Yp, l) of the partition plate 48 is calculated (set) assuming that a tumble flow is generated away from the wall surface of the combustion chamber 22.

In that case, a good tumble flow having a uniform circulation time and a uniform circulation axis can be generated by causing the tumble flow generated within the planes of the cross-sectional shapes a and b in FIGS. 2B and 2C to have the same speed.

In detail, the shape Lb(Yp, l) of the partition plate 48 is calculated (set) in accordance with expression (5) indicated below.

$$Lb(Yp,l)=Ip(Yp,l)+b \quad (5)$$

Figure 6:
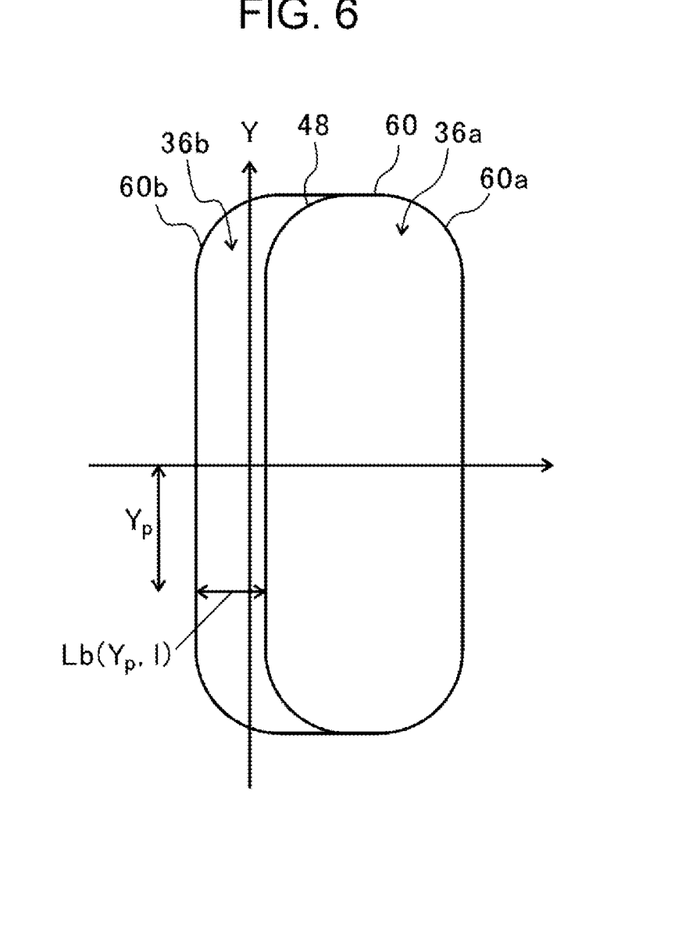
FIG. 6 is a schematic cross-sectional view of an intake pipe and a partition plate according to a modification.

FIG. 6 is a schematic cross-sectional view of the intake pipe 60 and the partition plate 48 according to this modification. In FIG. 6, the shape Lb(Yp, l) of the partition plate 48 calculated from expression (5) is illustrated. As illustrated in FIG. 6, the partition plate 48 has a curved shape in the cross section orthogonal to the extending direction of the intake pipe 60.

It is apparent from expression (5) that the shape Lb(Yp, l) of the partition plate 48 is set based on the shape 60b (Ip(Yp, l)) of the surface of the intake pipe 60 that faces the partition plate 48 in the second intake passage 36b.

By setting the shape Lb(Yp, l) of the partition plate 48 based on the shape 60b (Ip(Yp, l)) of intake pipe 60, the distance between the intake pipe 60 (i.e., the shape 60b) and the partition plate 48 can be fixed, so that the flow-speed distribution of intake air flowing within the second intake passage 36b can be made uniform in the Y direction.

Accordingly, by setting the shape Lb(Yp, l) of the partition plate 48 that satisfies expression (5), the speed of the tumble flow in the y-z cross section of the combustion chamber 22 can be made the same, whereby a good tumble flow having a uniform circulation time and a uniform circulation axis can be generated.

Therefore, according to this modification, the shape Lb(Yp, l) of the partition plate 48 that satisfies expression (5) is set, so that a partition plate 48 that can effectively generate a tumble flow and that can improve the combustion stability of the engine 1 can be provided.

Although a preferred example of the present invention has been described above with reference to the appended drawings, the present invention is not limited to the example. It is apparent to a skilled person that various modifications and alterations are conceivable within the technical scope described in the claims, and it is to be understood that such modifications and alterations belong to the technical scope of the present invention.

For instance, the partition plate 48 may be given an intermediate shape between FIGS. 5 and 6 by performing an interpolation process on the shapes of the partition plate 48 in FIGS. 5 and 6.

The above description corresponds to a case where the first intake passage 36a is closed. Alternatively, the second intake passage 36b may be closed such that a tumble flow may be generated by intake air traveling through the first intake passage 36a. In that case, the shape Lb(Yp, l) of the partition plate 48 is set based on a shape 60a of the surface of the intake pipe 60 that faces the partition plate 48 with the first intake passage 36a interposed therebetween.

According to the example of the present invention, a partition plate that can effectively generate a tumble flow and that can improve the combustion stability of the engine can be provided.

The invention claimed is:

1. A partition plate configured to separate an intake passage formed by an intake pipe to be coupled to a combustion chamber into a first intake passage and a second intake passage, the first intake passage being openable and closable by a valve,
    wherein a shape of a first cross section orthogonal to an extending direction of the intake pipe is calculated based at least in part on a shape of a surface of the intake pipe that faces the partition plate with the second intake passage interposed therebetween,
    wherein the shape of the first cross section is calculated based at least in part on a shape of the combustion chamber,
    wherein the shape of the first cross section satisfies an expression indicated below:

$$Lb(Yp,l)=Ip(Yp,l)+a \cdot La(x,\theta)+b$$

where Lb(Yp, l) denotes the shape of the first cross section, Ip(Yp, l) denotes the shape of the surface of the intake pipe that faces the partition plate with the second intake passage interposed therebetween, La(x, θ) denotes a length in a circumferential direction along a wall surface of the combustion chamber in a second cross section including a first direction corresponding to an axial direction of a cylinder bore of an engine and a second direction extending from an intake side toward an exhaust side of the combustion chamber, a and b denote predetermined coefficients, Yp denotes any position in a longitudinal direction in the first cross section, l denotes any position in the extending direction, and θ denotes a crank angle of the engine.

2. A partition plate configured to separate an intake passage formed by an intake pipe to be coupled to a combustion chamber into a first intake passage and a second intake passage, the first intake passage being openable and closable by a valve,
    wherein a shape of a first cross section orthogonal to an extending direction of the intake pipe is calculated based at least in part on a shape of a surface of the intake pipe that faces the partition plate with the second intake passage interposed therebetween
    wherein the shape of the first cross section is calculated based at least in part on a shape of the combustion chamber,
    wherein the shape of the first cross section is calculated based at least in part on a length in a circumferential direction along a wall surface of the combustion chamber in a second cross section including a first direction corresponding to an axial direction of a cylinder bore of an engine and a second direction extending from an intake side toward an exhaust side of the combustion chamber,
    wherein the shape of the first cross section satisfies an expression indicated below:

$$Lb(Yp,l)=Ip(Yp,l)+a \cdot La(x,\theta)+b$$

where Lb(Yp, l) denotes the shape of the first cross section, Ip(Yp, l) denotes the shape of the surface of the intake pipe that faces the partition plate with the second intake passage interposed therebetween, La(x, θ) denotes a length in a circumferential direction along a wall surface of the combustion chamber in a second cross section including a first direction corresponding to an axial direction of a cylinder bore of an engine and a second direction extending from an intake side toward an exhaust side of the combustion chamber, a and b denote predetermined coefficients, Yp denotes any position in a longitudinal direction in the first cross section, l denotes any position in the extending direction, and θ denotes a crank angle of the engine.

3. A partition plate configured to separate an intake passage formed by an intake pipe to be coupled to a combustion chamber into a first intake passage and a second intake passage, the first intake passage being openable and closable by a valve,
wherein a shape of a first cross section orthogonal to an extending direction of the intake pipe is calculated based at least in part on a shape of a surface of the intake pipe that faces the partition plate with the second intake passage interposed therebetween,
wherein the shape of the first cross section satisfies an expression indicated below:

$$Lb(Yp,l)=Ip(Yp,l)+b$$

where Lb(Yp, l) denotes the shape of the first cross section, Ip(Yp, l) denotes the shape of the surface of the intake pipe that faces the partition plate with the second intake passage interposed therebetween, b denotes a predetermined coefficient, Yp denotes any position in a longitudinal direction in the first cross section, and l denotes any position in the extending direction.

4. The partition plate according to claim 3,
wherein the shape of the first cross section is calculated based at least in part on a shape of the combustion chamber.

5. The partition plate according to claim 4,
wherein the shape of the first cross section is calculated based at least in part on a length in a circumferential direction along a wall surface of the combustion chamber in a second cross section including a first direction corresponding to an axial direction of a cylinder bore of an engine and a second direction extending from an intake side toward an exhaust side of the combustion chamber.

* * * * *